United States Patent
Pedersen

(10) Patent No.: US 8,287,006 B2
(45) Date of Patent: Oct. 16, 2012

(54) TUBE COUPLING SYSTEM FOR A PRESSURISED FLUID SYSTEM

(75) Inventor: Egil Pedersen, Raufoss (NO)

(73) Assignee: Kongsberg Automotive AS, Kongsberg (NO)

( * ) Notice: Subject to any disclaimer, the term of this patent is extended or adjusted under 35 U.S.C. 154(b) by 214 days.

(21) Appl. No.: 12/745,432

(22) PCT Filed: Nov. 28, 2007

(86) PCT No.: PCT/IB2007/003889
§ 371 (c)(1),
(2), (4) Date: May 28, 2010

(87) PCT Pub. No.: WO2009/068934
PCT Pub. Date: Jun. 4, 2009

(65) Prior Publication Data
US 2010/0308572 A1    Dec. 9, 2010

(51) Int. Cl.
*F16L 17/00* (2006.01)
(52) U.S. Cl. .......... 285/104; 285/13; 285/255; 285/307; 285/343
(58) Field of Classification Search .............. 285/14, 285/13, 342, 343, 255, 1, 104, 95, 307
See application file for complete search history.

(56) References Cited

U.S. PATENT DOCUMENTS

| | | | |
|---|---|---|---|
| 3,584,900 A | 6/1971 | Lennon et al. | |
| 4,253,683 A | 3/1981 | Jentsch et al. | |
| 4,462,622 A | 7/1984 | Barzuza | |
| 4,875,709 A * | 10/1989 | Caroll et al. | 285/14 |
| 6,431,608 B1 | 8/2002 | Kato | |
| 7,581,763 B2 * | 9/2009 | Salomon-Bahls | 285/104 |
| 2003/0146623 A1 | 8/2003 | Lacroix | |
| 2007/0284875 A1 * | 12/2007 | Salomon-Bahls et al. | 285/148.19 |

FOREIGN PATENT DOCUMENTS

| | | |
|---|---|---|
| DE | 19626016 A1 | 1/1997 |
| DE | 19623995 A1 | 12/1997 |
| EP | 0226689 A1 | 7/1987 |
| EP | 0468629 A2 | 1/1992 |

(Continued)

OTHER PUBLICATIONS

International Patent Application No. PCT/IB2007/003889; International filing date Nov. 28, 2007; 23 pages.

(Continued)

*Primary Examiner* — David E Bochna
(74) *Attorney, Agent, or Firm* — Howard & Howard Attorneys PLLC

(57) ABSTRACT

A tube coupling system (1) for a pressurised fluid system comprising a coupling body (3) for receiving a tube (5) of a pressurized fluid system, a leakage seal (7) for preventing fluid supplied from the pressurized fluid system via the tube to enter the coupling body (3), a gripping member (9) for gripping the outer surface of the tube (5) received in the coupling body (3), and an environment seal (11) for preventing intrusion from outside of the coupling body (3), characterized in that said environment seal (11) is at least partially displaceable and arranged to be pressed at least partially off a sealing seat when there is internal fluid pressure in the coupling body (3) resulting in a fluid stream out of the coupling body (3) and said fluid stream to the outside of the coupling body (3) indicates a leakage from the pressurized fluid system.

17 Claims, 4 Drawing Sheets

FOREIGN PATENT DOCUMENTS

| | | | |
|---|---|---|---|
| EP | 0748975 | A1 | 12/1996 |
| EP | 0753698 | A1 | 1/1997 |
| EP | 0758066 | A1 | 2/1997 |
| FR | 2867546 | A1 | 9/2005 |
| WO | 0201105 | A2 | 1/2002 |
| WO | 2005064221 | A1 | 7/2005 |
| WO | 2006037962 | A1 | 4/2006 |
| WO | 2006041285 | A2 | 4/2006 |
| WO | 2006112726 | A1 | 10/2006 |
| WO | 2009068934 | A1 | 6/2009 |

OTHER PUBLICATIONS

International Search Report for International Patent Application No. PCT/IB2007/003889; mailed on Sep. 9, 2008; 3 pages.

Written Opinion of the International Searching Authority for International Patent Application No. PCT/IB2007/003889; mailed on Sep. 9, 2008; 5 pages.

DE Publication No. 196 23 995 and the English language Abstract of DE Publication No. 196 23 995 from the European Patent Office; dated Dec. 18, 1997; 9 pages.

DE Publication No. 196 26 016 and the English language Abstract of DE Publication No. 196 26 016 from the European Patent Office; dated Jan. 2, 1997; 9 pages.

EP Publication No. 0 748 975 and the English language Abstract of EP Publication No. 0 748 975 from the European Patent Office; dated Dec. 18, 1996; 12 pages.

EP Publication No. 0 753 698 and the English language Abstract of EP Publication No. 0 753 698 from the European Patent Office; dated Jan. 15, 1997; 9 pages.

EP Publication No. 0 758 066 and the English language Abstract of EP Publication No. 0 758 066 from the European Patent Office; dated Feb. 12, 1997; 7 pages.

FR Publication No. 2 867 546 and the English language Abstract of FR Publication No. 2 867 546 from the European Patent Office; dated Sep. 16, 2005; 14 pages.

* cited by examiner

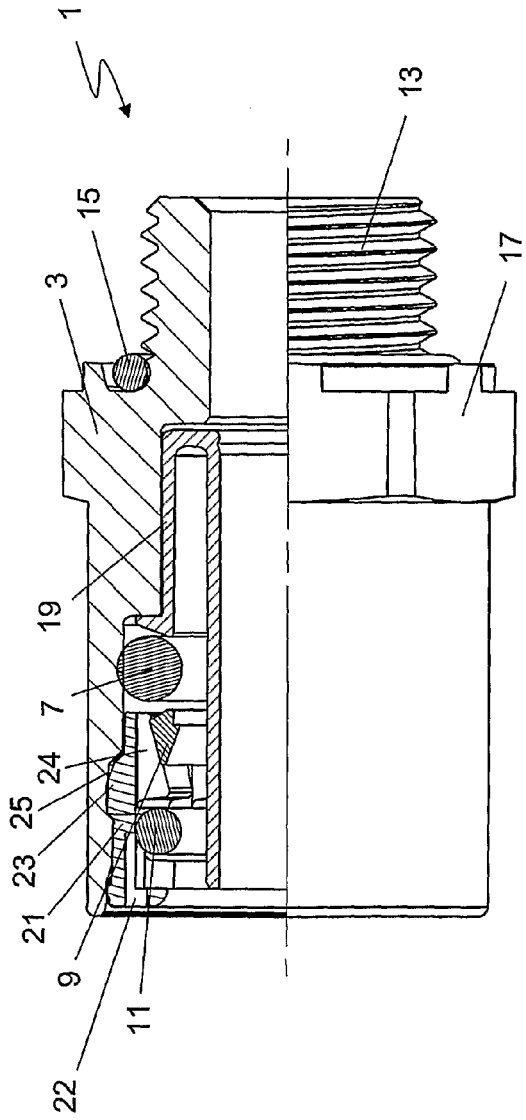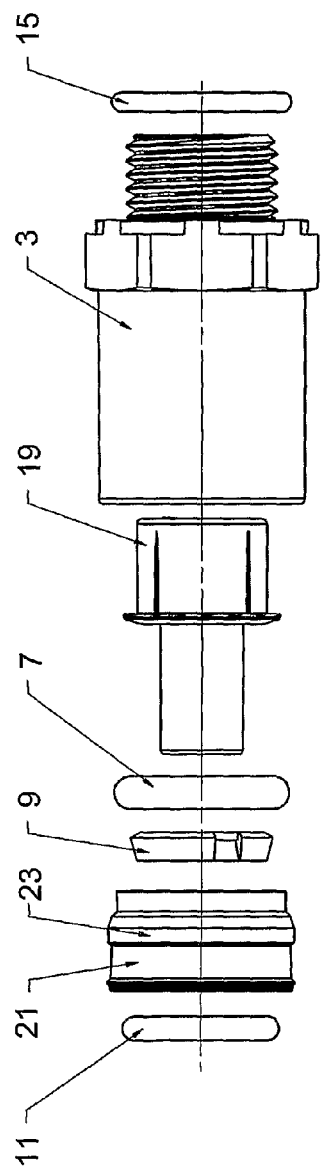

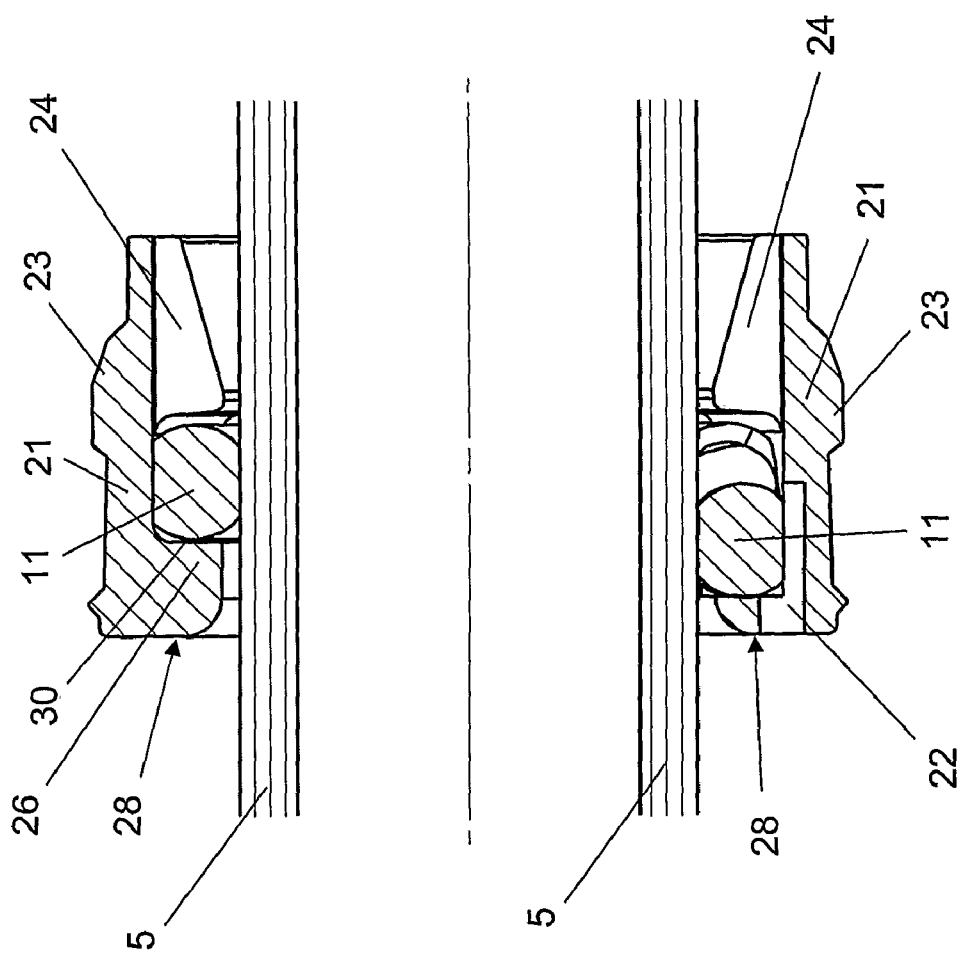

TUBE COUPLING SYSTEM FOR A PRESSURISED FLUID SYSTEM

The subject patent application claims priority to and all the benefits of International Application No. PCT/IB2007/003889, which was filed on Nov. 28, 2007 with the World Intellectual Property Organization, the disclosure of which is hereby incorporated by reference.

BACKGROUND OF THE INVENTION

1. Field of the Invention

The present invention relates to tube coupling system for a pressurised fluid system comprising a coupling body for receiving a tube of a pressurised fluid system, a leakage sealing means for preventing fluid from the pressurised fluid system to enter the coupling body, a gripping means for gripping the outer surface of the tube received in the coupling body, and an environment sealing means for preventing intrusion from outside of the coupling body.

2. Description of the Related Art

In many applications tubes must be connected with each other or with other components in such a way that leakage is prevented and unintentional release of the tube is precluded. This is particularly important in systems where malfunction and failure of the tube coupling can be hazardous and lead to serious damages, for instance in a braking system of a vehicle. A typical tube connector for such a purpose can be found in WO 2006/112726 A1.

The most common failure in form of leakage and unintentional release is due to an incorrect assembly when the tube is connected to a coupling system. The case that the tube is not sufficiently inserted into a coupling system is an example of such an incorrect assembly. Especially when the insertion force is high due to tight gripping or sealing means that are used in high-pressure systems, the engagement of the tube with a final stop portion may not be evident to a user during manual assembly. In addition, if the end of the tube is not cut at right angle, e.g. because it was manually shortened before assembly, the point of sufficient insertion can be vague.

Therefore, some feedback is needed indicating the assembler when the tube is sufficiently and correctly inserted in a coupling body.

It is known to provide visual markings on the outer surface of the tube giving the assembler a visual indication on when a predetermined insertion depth has been reached. This can for example be a line that needs to be covered by the coupling body when the tube is sufficiently inserted into the coupling system. However, this solution is disadvantageous as the tube cannot be shortened to an appropriate length without losing the visual markings at one or both ends. Furthermore, there is an uncertainty about the positioning of the marking and the ability to judge whether the visual markings indicate full insertion or not.

Other common solutions provide the user with a recognizable push-in feeling that indicates when the tube is in correct position. This requires that the user is able to make a distinction in the feeling which is for example difficult when using, a tool for assembly. Moreover, a recognisable push-in feeling is a highly subjective measure which various users might experience differently.

A tube coupling system according to the preamble of claim 1 is known from WO 2006/112726 A1. However, the problem of providing the assembler with a feedback signal when the tube is sufficiently and correctly inserted is not addressed therein.

WO 2006/037962 A1 discloses a tube coupling and addresses the feedback problem by providing an audible indication of the fully-inserted position of the tube. The coupling system disclosed therein comprises a tube support member on which a tube is slid on to. During insertion of the tube into the coupling the tube pushes in the tube support member which is therefore urged to slide deeper into the coupling body. A groove and tongue configuration between the outer surface of the tube support member and the inner surface of the coupling body provides an audible click signal notifying the user that the tube with the tube support member has reached a fully-inserted position.

The solution described in WO 2006/037962 A1 has the disadvantage that the audible click signal only notifies the user indirectly, namely that tube support member has reached a fully-inserted position rather than the tube being fully inserted into the coupling. So, there is no information given whether the tube is really fully inserted in the tube support member. The risk of leakage and unintentional release due to an incorrect assembly of the tube into the tube support member therefore still remains. In addition, there is no information given whether the tube remains in the correct fully-inserted position during normal use of the tube coupling system. Furthermore, the push-in force during insertion of the tube is significantly increased by the resistance that the groove and tongue configuration poses to produce an audible click signal. This resistance must be relatively large, because a premature click signal before the tube has reached a final stop portion of the tube support member would be detrimental. This resistance force adds up to the friction caused by gripping or sealing means yielding an uncomfortably high total push-in force. Such a required high total push-in force in turn can easily lead to a high frictional force between the tube and the tube support member when the tube is applied in a slightly tilted way, for example. If this frictional force exceeds the click resistance, a detrimental premature click signal is triggered before the tube is fully inserted into the tube support member.

The object of the present invention is to overcome the disadvantages of the prior art and to provide a tube coupling system that really assures a user of the tube being sufficiently and correctly inserted into the coupling after assembly and during normal use. Furthermore, a continuous check of the leak tightness is desirable.

SUMMARY OF THE INVENTION AND ADVANTAGES

This object is solved by the subject-matter of claim 1. According to the present invention a tube coupling system for a pressurised fluid system is provided comprising a coupling body for receiving a tube of a pressurised fluid system, a leakage sealing means for preventing fluid supplied from the pressurised fluid system via the tube to enter the coupling body, a gripping means for gripping the outer surface of the tube received in the coupling body, and an environment sealing means for preventing intrusion from outside of the coupling body, characterised in that said environment sealing means is at least partially displaceable and arranged to be pressed at least partially off a sealing seat when there is internal fluid pressure in the coupling body resulting in a fluid stream out of the coupling body and said fluid stream to the outside of the coupling body indicates a leakage from the pressurised fluid system.

The inventive tube coupling system ensures that the fluid stream is always large enough to be noticeable by the user. Before the environment sealing means are at least partially pressed off of the sealing seat a fluid pressure builds up in side the coupling body. When the pressure exceeds an amount that is necessary to urge the environment sealing means off the sealing seat there is a strong enough fluid stream available to indicate a leakage.

Preferably, the fluid stream to the outside of the coupling body generates an audible feedback signal indicating a leakage from the pressurised fluid system. This audible feedback signal can be for example a whistle or fizzling tone if the fluid is air or another gaseous fluid. If the fluid is a liquid or optically distinguishable from air the leakage indication could also be an optical signal of the escaping fluid stream.

In a preferred embodiment the environmental sealing means, typically an o-ring, is located in a annular groove, which groove has a cut-out allowing the environmental sealing means to be at least partially pressed off the sealing seat when there is an internal fluid pressure in the coupling body. The sealing seat of the environmental sealing means is preferably an annular surface located at an axially inner portion of the annular groove.

The preferably flexible and resiliently deformable environmental sealing means can be arranged to get back into contact with the sealing seat once the internal fluid pressure in the coupling body is below a certain threshold value. For example, the environmental sealing means may be flexible having return spring features. The threshold value should then be far lower than the usual pressure of the pressurised fluid system, such that even a very small leakage will lead to a pressure buildup that is quickly indicated. The environmental sealing means can also be designed as a disposable, breaking component that is adapted to be pressed off the sealing seat only once.

A bore may also be provided enabling a fluid stream from the inside of the coupling body to the outside of the coupling body when the environmental sealing means is at least partially pressed off the sealing seat due to an internal fluid pressure in the coupling body. Such a bore has the advantage that the fluid stream is guided through the bore to produce a more controlled and noticeable signal to the user. The bore size may be chosen such that a warning whistle is produced by the fluid stream or it may be equipped with further means for that purpose.

I. BRIEF DESCRIPTION OF THE DRAWINGS

In the following preferred embodiments of the invention are further described in more detail with reference to the FIGS. 1 to 5.

FIG. 1 shows a side view of a preferred tube coupling system with one half shown as a longitudinal cut-view.

FIG. 2 displays an exploded view of a preferred tube coupling system.

FIG. 5 shows a detailed longitudinal cut-view of the environmental sealing means with one part being pressed off the sealing seat.

DETAILED DESCRIPTION OF THE EXEMPLARY EMBODIMENT

Figure 3:
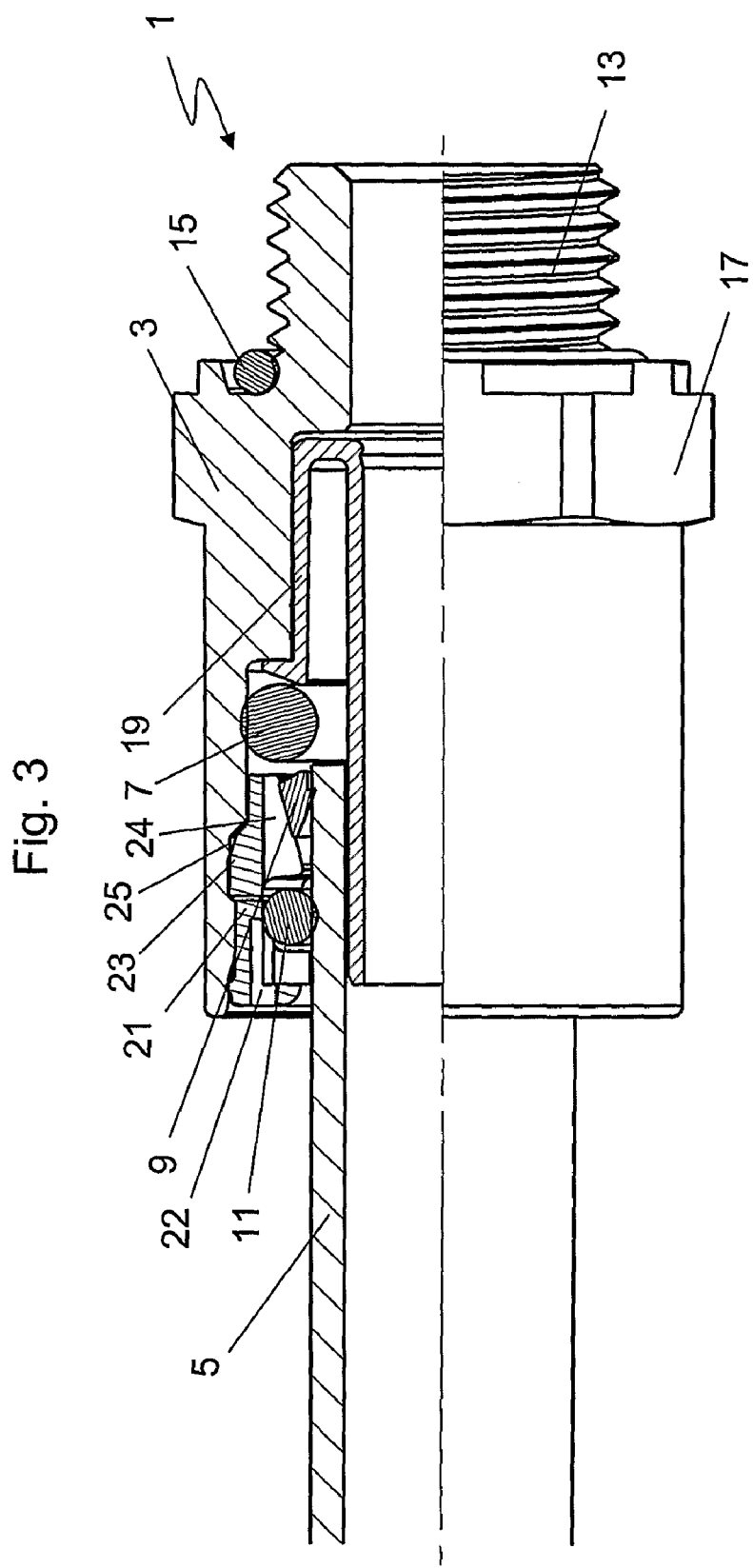
FIG. 3 shows a side view of a preferred tube coupling system with one half shown as a longitudinal cut-view and with a not sufficiently inserted tube.

The tube coupling system 1 shown in coupling FIG. 1 comprises a coupling body 3 for receiving a tube 5 of a pressurized fluid system, a leakage seal or leakage sealing means 7 for preventing fluid from the pressurised fluid system to enter the coupling body 3, a gripping member or gripping means 9 for gripping the outer surface of the tube 5 received in the coupling body 3, and an environment seal or environment sealing means 11 for preventing intrusion from outside of the coupling body 3. The end of the coupling body 3 that is not intended to receive the tube 5 is provided with a threaded connector end 13 and a seal 15. The coupling body 3 further comprises a section with an outer shape 17 suited to receive a wrench for screwing the tube coupling system 1 with its threaded connector end 13 into another component of the pressurised fluid system.

In this embodiment the tube coupling system 1 comprises a tube support sleeve 19 which is inserted into the coupling body 3 from the end that is intended to receive the tube 5. The inner shape of the coupling body 3 is adapted to receive the outer collar of the tube support sleeve 19 to securely maintain the tube support sleeve 19 in a radial direction. The tube support sleeve 19 is pushed into the coupling body 3 until a flange section of the tube support sleeve 19 abuts against an inner rim in the coupling body 3 that provides a final stop for the tube support sleeve 19 to be pushed into the coupling body 3. The inner collar of the tube support sleeve 19 is adapted to fit into a tube 5 that is intended to be received by the coupling system 1. The outer collar of the tube support sleeve 19 is adapted to fit onto the outer surface of the tube 5 such that an end portion of the tube 5 is enclosed by the tube support sleeve 19. The tube support sleeve 19 that is fixed in the coupling body 3 therefore provides a guidance for the tube 5 during insertion and a stabilisation of the tube 5 in the coupling body 3 once it is inserted. The inner shape of the coupling body 3 provides a cavity section to receive sealing and gripping means which are inserted into the coupling body 3 after the tube support sleeve 19 has been inserted. By this the tube support sleeve 19 is prevented from a release out of the coupling body 3 by the sealing and securing means.

The sealing and securing means include a leakage sealing means for preventing fluid from the pressurised fluid system to enter the cavity section of the coupling body 3. The leakage sealing means 7 fits in tight connection between the inner surface of the coupling body 3 and the outer surface of an inserted tube 5. The leakage sealing means 7 is preferably an o-ring of rubber material that, before insertion of the tube, partially projects into the void that is intended to receive the tube 5. When the tube 5 is inserted deep enough into the tube coupling system 1 to reach the leakage sealing means 7 the leakage sealing means 7 are deformed to a tight sealing fit between the tube 5 and the coupling body 3.

Axially further outward in the cavity section of the coupling body 3 the means for securing the tube 5 within the tube coupling system 1 are located. The securing means comprise a gripping means 9, preferably a gripper ring, for gripping the outer surface of the tube 5 received in the tube coupling system 1. Furthermore, the securing means include an insert 21 being preferably formed in an axially inner portion with a plurality of internal protrusions 24 disposed at intervals along an inner circumference of the insert 21. The protrusions 24 include an inner end facing the environmental sealing means 11. The protrusions 24 form a segmented conical inner portion with a decreasing diameter in the direction towards the axially outer end of the insert 21. The gripping means 9 have a radially outer conical surface which substantially corresponds to the inner segmented conical portion of the insert 21. The securing means is a combination of features from the insert 21 and the gripping means 9. The gripping means 9 are axially movable. The arrangement of the insert 21 and the gripping means 9 is such that an axially outward force applied to the tube 5 held in the tube coupling system 1 will transfer to an increase of a compressive force applied by the gripping means 9 on the outer surface of the tube 5. Any unintentional release force on the tube 5 will therefore trigger the gripping means 9 to react with an increased gripping force on the tube 5 such that the release force does not result in an actual release of the tube 5.

The axially outer portion of the insert 21 is preferably provided with an annular groove to receive the environment seal or environment sealing means 11 having a first position for sealing the coupling body 3 and a second position for allowing fluid to flow out of the coupling body 3. The environment sealing means 11 is typically an o-ring of rubber material, for preventing intrusion from outside of the coupling body 3. Alternatively, the environment sealing means 11 could be located between an axially outer surface of the internal protrusions 24 of the insert 21 and an axially outer flange 28 of the insert 21. The environment sealing means 11 is not axially secured in the annular groove or space between the protrusions 24 and the flange 28 of the insert 21. Preferably, the groove or space has a larger axial extension than the environment sealing means 11. Alternatively, the groove or space has an axially outer cut-out allowing the environmental sealing means 21 to move axially outward off the sealing seat when there is an internal fluid pressure in the coupling body. The sealing seat of the environment sealing means 11 is the surface of the axially inner portion of the groove or space. If an internal, fluid pressure in the cavity section of the coupling body 3 builds up due to a leakage of the leakage sealing means 7, the internal fluid pressure urges the environment sealing means 11 at least partially outward off the sealing seat. Once the environment sealing means 11 has at least partially lost the contact with the sealing seat, a fluid stream passes the environment sealing means 11 to the outside of the coupling body 3. This audible or visible fluid stream indicates a leakage from the pressurised fluid system.

Preferably, the fluid is air and the air stream to the outside of the coupling body 3 generates an audible feedback signal indicating a leakage from the pressurised fluid system. In a preferred embodiment a bore 22 is provided in the insert 21 enabling a fluid stream from the cavity section of the coupling body 3 to the outside of the coupling body 3 when the environmental sealing means 11 is pressed off the sealing seat due to an internal fluid pressure in the coupling body 3. Such a bore 22 has the advantage that the fluid stream is guided through the bore 22 to produce a more controlled and noticeable signal.

FIG. 2 shows an exploded view of the tube coupling system 1 with all components separated. This representation is particularly useful to describe the way the tube coupling system 1 is assembled. The seal 15 for the end that is not intended to receive the tube 5 is put over the threaded connector end 13 into a sealing position at the base of the thread. The tube support sleeve 19 is fed into the coupling body 3 through the opening of the coupling body 3 that is intended to receive the tube 5. Next follows the leakage sealing means 7 which abuts against the inner collar of the tube support sleeve 19 once it is sufficiently inserted. The gripping means 9 in form of a conical gripper ring is then inserted. The insert 21 has special design such that it is secured in the coupling body 3 once it is correctly inserted. The insert 21 has a bulge 23 on its radially outer surface which corresponds to an annular recess 25 along the radially inner circumference of the cavity section of the coupling body 3. To facilitate insertion of the insert 21 the boss or bulge 23 has a tapering portion at the axially inner side. Once the insert 21 is pushed into the coupling body 3 the bulge-and-recess configuration secures the insert 21 itself and all those components inside the coupling body 3 that are located axially more inwards. The environmental sealing means 11 in form of a flexible o-ring of rubber material can then be inserted into the annular groove inside the insert 21 to contact the sealing seat.

FIG. 3 demonstrates a situation in which a tube 5 is not sufficiently inserted into the tube coupling system 1. The tube 5 is not inserted deep enough for the leakage sealing means 7 to provide a tight fit between the outer surface of the tube and the inner surface of the coupling body 3. In this situation there is no fluid pressure in the tube 5. As soon as a fluid pressure is applied in the pressurised system and the tube 5 a leakage of fluid into the cavity section of the coupling body 3 and a fluid pressure is built up therein. FIG. 3 shows the environmental sealing means 11 in contact with the sealing seat as long as there is no pressure applied to the system. As there is frictional contact between the tube 5 and the environmental sealing means 11 during insertion the environmental sealing means 11 are urged during insertion of the tube 5 into the inner portion of the annular groove to contact the sealing seat. Once the fluid pressure in the cavity section of the coupling body 3 is above a threshold value the pressure is strong enough to push the environmental sealing means 11 axially outwards off the sealing seat.

Alternatively, the outer flange 28 of the insert 21 is provided with one or more stopper protrusions 26 disposed at intervals along the axially inner circumference, which stopper protrusions 26 extend axially inwards to form contact surfaces 30 to keep the environmental sealing means 11 partially in the contact with the sealing seat even if there is fluid pressure inside the coupling body 3. However, those parts of the environmental sealing means 11 with no contact to the stopper protrusions 26 are pressed off the sealing seat upon internal fluid pressure because the environmental sealing means 11 is flexible. Preferably, an axial bore 22 is provided in the in 21 extending axially from the annular groove or space in which the environmental sealing means 11 is located to the outside of the tube coupling system 1. It is advantageous, if the bore is located circumferencially centrally at the inner circumference between two stopper protrusions 26 disposed at intervals along the inner circumference at the outer flange 28 of the insert 21. At the center between two stopper protrusions 26 the outward bend of the flexible environmental seal means 11 due to internal fluid pressure is largest. As soon as the flexible environmental sealing means 11 partially bends outwards off the sealing seat a channel through the bore 22 is opened up such that a fluid stream from the inside of the coupling body 3 to the outside of the coupling body 3 is enabled through that channel.

Figure 4:
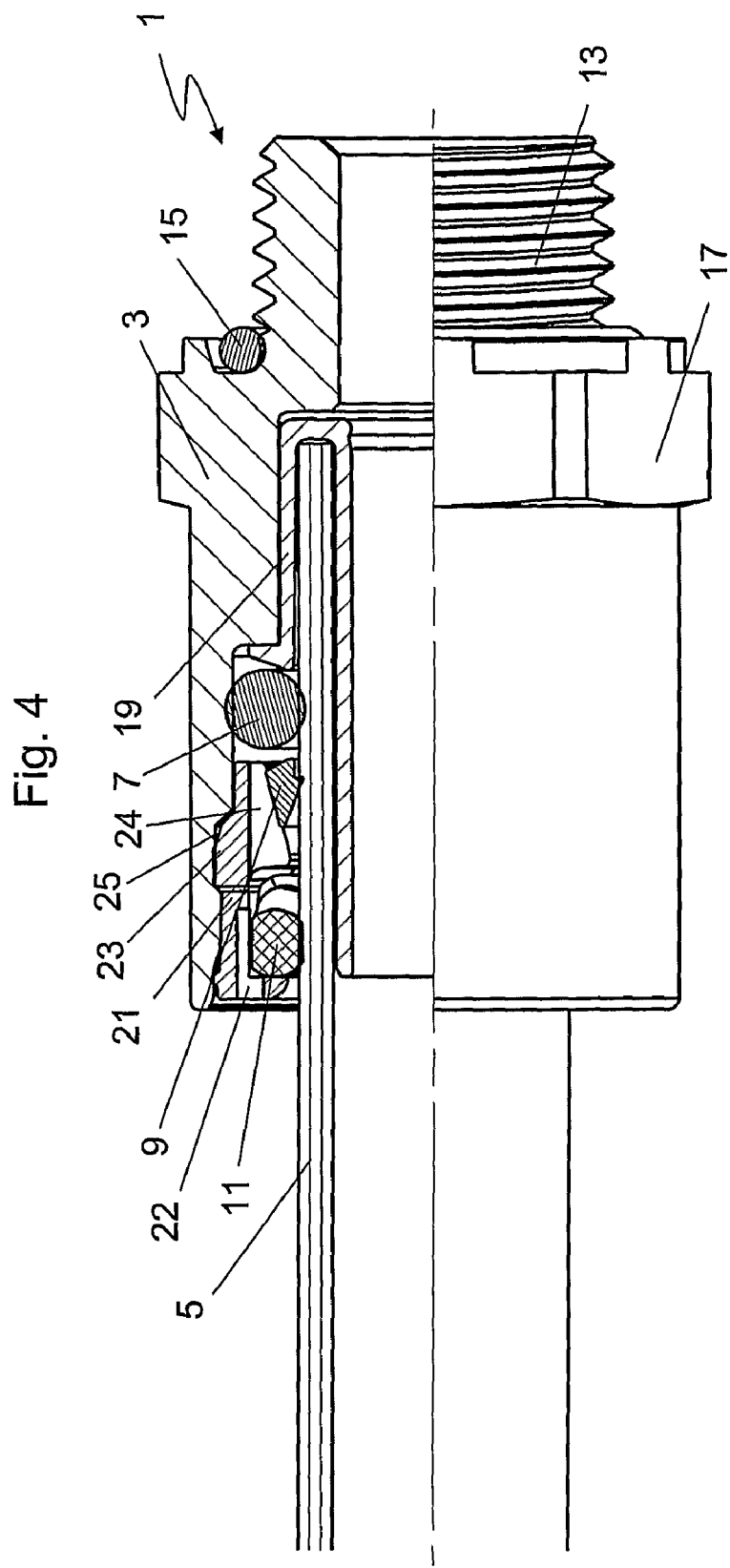
FIG. 4 shows a side view of a preferred tube coupling system with one half shown as a longitudinal cut-view and with a sufficiently inserted tube.

FIG. 4 demonstrates a situation in which a tube 5 is fully inserted into the tube coupling system 1. In this situation there is fluid pressure applied in the tube 5. The tube 5 is correctly inserted and there should be no fluid leakage out of the system. However, the environmental sealing means 11 are partially pressed off the sealing seat due to a fluid pressure in the cavity section of the coupling body 3. This indicates a fluid leakage at the leakage sealing means 7. The leakage can be for example be due to wear, abrasion, ageing or deterioration of the leakage sealing means 7. The fluid stream to the outside of the coupling body 3 indicates the leakage by a an audible feedback signal in form a whistle or fizzling tone if the fluid is air or another gaseous fluid.

FIG. 5 gives a more detailed view of the functioning of the environmental sealing means 11. The upper section of the longitudinal cut-view shows a cut through a portion of the system at which a stopper protrusion 26 disposed at the outer flange 28 of the insert 21 secures with its contact surface 30 a part of the environmental sealing means 11 in contact with the sealing seat even if there is fluid pressure inside the coupling body 3. The lower section of the longitudinal cutview shows a cut through a portion of the system at which an axial bore 22 in the insert is provided and no stopper protrusion 26 prevents the environmental sealing means 11 from bending outwards due to internal fluid pressure. The bore 22 extends from outside of the tube coupling system 1 to the annular groove in which the environmental sealing means 11 is located. If there is internal fluid pressure in the cavity section of the coupling body 1, as shown in the lower section of FIG. 5, a channel to the axial bore 22 opens up resulting in a fluid stream out of the coupling body 3, wherein said fluid stream to the outside of the coupling body 3 indicates a leakage from the pressurised fluid system.

The invention claimed is:

1. A tube coupling system (1) for a pressurised fluid system having a tube (5) defining an outer surface with a fluid flowing through the tube (5), said tube coupling system comprising:
 a coupling body (3) for receiving the tube (5),
 a leakage seal (7) disposed within said body (3) for preventing the fluid supplied from the tube (5) from entering said coupling body (3),
 a gripping member (9) disposed within said body (3) for gripping the outer surface of the tube (5) received in said coupling body (3),
 a protrusion (24) coupled to said body (3) and defining at least a portion of a sealing seat, and
 an environment seal disposed within said body (3) and (11) having a first position engaging said sealing seat for sealing said coupling body (3), and a second position at least partially displaceable and arranged to be pressed at least partially off said sealing seat when there is internal fluid pressure in said coupling body (3) for allowing the fluid to flow out of said coupling body (3) to indicate a leakage;
 wherein at least one part of said environmental seal (11) is arranged to remain in contact with said sealing seat when there is internal fluid pressure in said coupling body (3).

2. A tube coupling system according to claim 1, wherein said environmental seal (11) is at least partially resiliently deformable by said internal fluid pressure in said coupling body (3).

3. A tube coupling system (1) for a pressurised fluid system having a tube (5) defining an outer surface with a fluid flowing through the tube (5), said tube coupling system comprising:
 a coupling body (3) for receiving the tube (5),
 a leakage seal (7) disposed within said body (3) for preventing the fluid supplied from the tube (5) from entering said coupling body (3),
 a gripping member (9) disposed within said body (3) for gripping the outer surface of the tube (5) received in said coupling body (3),
 a protrusion (24) coupled to said body (3) and defining at least a portion of a sealing seat,
 an environment seal disposed within said body (3) and (11) having a first position engaging said sealing seat for sealing said coupling body (3), and a second position at least partially displaceable and arranged to be pressed at least partially off said sealing seat when there is internal fluid pressure in said coupling body (3) for allowing the fluid to flow out of said coupling body (3) to indicate a leakage; and
 a plurality of stopper protrusions (26) coupled to said body (3) and spaced from each other about an inner surface of said body (3) to define axially outer cut-outs spaced between said stopper protrusions (26) and said stopper protrusions (26) extend axially inwards to form contact surfaces (30) to keep said environmental seal (11) partially in contact with said sealing seat.

4. A tube coupling system (1) for a pressurised fluid system having a tube (5) defining an outer surface with a fluid flowing through the tube (5), said tube coupling system comprising:
 a coupling body (3) for receiving the tube (5),
 a leakage seal (7) disposed within said body (3) for preventing the fluid supplied from the tube (5) from entering said coupling body (3),
 a gripping member (9) disposed within said body (3) for gripping the outer surface of the tube (5) received in said coupling body (3),
 a protrusion (24) coupled to said body (3) and defining at least a portion of a sealing seat,
 an environment seal disposed within said body (3) and (11) having a first position engaging said sealing seat for sealing said coupling body (3), and a second position at least partially displaceable and arranged to be pressed at least partially off said sealing seat when there is internal fluid pressure in said coupling body (3) for allowing the fluid to flow out of said coupling body (3) to indicate a leakage; and
 an insert (21) defining an annular groove and supporting said protrusion (24) for selectively receiving said environmental seal (11).

5. A tube coupling system according to claim 4, wherein said environmental seal (11) is further defined as an o-ring (11) engaging said annular groove of said insert and said annular groove presents an axially outer cut-out allowing said o-ring (11) to be at least partially pressed off said sealing seat when there is internal fluid pressure in said coupling body (3).

6. A tube coupling system according to claim 5, wherein said insert (21) defines a bore (22) extending axially from said annular groove for allowing the fluid to flow out of said coupling body (3) when said o-ring (11) is at least partially pressed off said sealing seat due to said internal fluid pressure in said coupling body (3).

7. A tube coupling system according to claim 4, wherein said annular groove presents an axially inner portion having a surface defining another portion of said sealing seat.

8. A tube coupling system according to claim 7, wherein said annular groove presents an axially outer cut-out allowing said environmental seal (11) to be at least partially pressed off said sealing seat when there is internal fluid pressure in said coupling body (3).

9. A tube coupling system according to claim 8, wherein said insert (21) defines an inner circumference and includes a plurality of stopper protrusions (26) spaced from each other along said inner circumference with said stopper protrusions (26) extending axially inwards to present contact surfaces (30) for allowing at least one part of said environmental seal (11) to remain in contact with said sealing seat when in said first and second positions.

10. A tube coupling system according to claim 9, wherein said insert (21) defines a bore (22) extending axially from said annular groove for allowing the fluid to flow out of said coupling body (3) when said environmental seal (11) is at least partially pressed off said sealing seat in said second position.

11. A tube coupling system according to claim 4, wherein said insert (21) defines an inner circumference and includes said protrusion (24) extending from said inner circumference.

12. A tube coupling system according to claim 11, wherein said protrusion (24) is further defined as a plurality of protrusions (24) spaced from each other about said inner circumference of said insert (21) with each of said protrusions (24) having an inner end facing said environmental seal (11).

13. A tube coupling system according to claim 12, wherein said insert includes a plurality of stopper protrusions (26) spaced from each other about said inner circumference of said insert (21) with each of said stopper protrusions (26) spaced axially away from each of said protrusions (24).

14. A tube coupling system according to claim 13, wherein each of said stopper protrusions (26) present a contact surface (30) facing said inner end of said protrusions (24).

15. A tube coupling system according to claim 14, wherein at least one of said stopper protrusions (26) defines a first distance between said inner end of said protrusions (24) and said contact surfaces (30) of said at least one stopper protrusions (26) such that said environmental seal (11) engages said contact surfaces (30) when in said first position.

16. A tube coupling system according to claim 15, wherein another one of said stopper protrusions (26) define a second distance between said inner end of said protrusions (24) and said contact surfaces (30) of said another one of said stopper protrusions (26) with said second distance greater than said first distance for allowing said environmental seal (11) to move from said first position to said second position.

17. A tube coupling system according to claim 12, wherein said protrusions (24) have a segmented inner portion defining a conical configuration and said gripping member (9) has an outer surface defining a conical configuration complementary to said conical configuration of said segmented inner portion such that said outer surface engages said segmented inner portion.

* * * * *